(12) United States Patent
Yusof et al.

(10) Patent No.: US 8,210,459 B2
(45) Date of Patent: Jul. 3, 2012

(54) CABLE OR CORD WINDER

(75) Inventors: Mohd Asri Yusof, Kuala Lumpur (MY);
Yuen Chang Chuah, Kuala Lumpur (MY); Toshihide Ooba, Tokyo (JP)

(73) Assignees: Sony EMCS (Malaysia) Sdn. Bhd., Kuala Lumpur (MY); Sony Corporation, Tokyo (JP)

( * ) Notice: Subject to any disclaimer, the term of this patent is extended or adjusted under 35 U.S.C. 154(b) by 844 days.

(21) Appl. No.: 11/847,782

(22) Filed: Aug. 30, 2007

(65) Prior Publication Data
US 2008/0128544 A1 Jun. 5, 2008

(30) Foreign Application Priority Data

Aug. 30, 2006 (MY) ................ PI 20064061
Jul. 3, 2007 (MY) ................ PI 20071056

(51) Int. Cl.
*B65H 75/00* (2006.01)
(52) U.S. Cl. ...................... 242/370; 242/407
(58) Field of Classification Search ........... 242/388.1, 242/388, 401, 402, 405, 405.1, 129, 129.1, 242/129.3, 378.1, 378.2, 386, 396, 306, 307, 242/370, 371, 398, 305, 223, 296, 407; 224/162, 224/257, 258; 24/3.13
See application file for complete search history.

(56) References Cited

U.S. PATENT DOCUMENTS
6,056,223 A * 5/2000 Kirby .................... 242/306

FOREIGN PATENT DOCUMENTS

| GB | 2096102 A * | 10/1982 |
|----|-------------|---------|
| JP | 07-312484 | 11/1995 |
| JP | 09-154196 | 6/1997 |
| JP | 11-40240 | 2/1999 |
| JP | 2000-53333 A | 2/2000 |
| JP | 2000-341381 | 12/2000 |
| JP | 2003-009932 | 1/2003 |

OTHER PUBLICATIONS

Japanese Office Action mailed on Jan. 24, 2012, issued for JP Application No. 2007-224432.

* cited by examiner

*Primary Examiner* — Michael Mansen
*Assistant Examiner* — Juan Campos, Jr.
(74) *Attorney, Agent, or Firm* — Oblon, Spivak, McClelland, Maier & Neustadt, L.L.P.

(57) ABSTRACT

A wire winder includes a body configured to anchor a wire and such that the wire extends from the body. The body is at least partially surrounded by a rotatable bobbin journalled on the body. The wire is windable onto the body within the rotatable bobbin from a direction substantially aligned with a bobbin axis. The bobbin rotation is indexed by coaction between at least one projection or depression on the body and at least one depression or projection on the bobbin.

11 Claims, 11 Drawing Sheets

CABLE OR CORD WINDER

CROSS REFERENCE TO RELATED APPLICATIONS

This application is based upon and claims the benefit of priority from prior Malaysian Patent Application Nos. PI20064061, filed Aug. 30, 2006, and PI20071056, filed Jul. 3, 2007, the entire contents of each of which are incorporated herein by reference.

FIELD OF THE INVENTION

The invention generally relates to winding mechanisms for wires, cords, cables, or similar elongate articles. More particularly the invention relates to winding mechanisms for small gauge electronic cables or support cords such as are used on headphones.

BACKGROUND OF THE INVENTION

Articles such as cable winding mechanisms are known, see for instance JP-A-H09-154196 which describes a plug mounted cable drum with a gear or handle wound drum having a detent mechanism. JP-A-H07-312484 similarly shows a spring tensioned winding drum with a detent mechanism which may be incorporated in mechanisms such as keyboards and telephones.

Such winders do not provide mechanisms which are as simple as possible, requiring slip rings or sockets to make contact with the outgoing conductors, a carefully journalled axle to rotate the winding drum around and a carefully crafted detent mechanism to stop the cord unwinding unless required.

Therefore a need exists for a solution to the problem of providing a simple easily constructed method of winding cords or cables.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The term 'cords' is used in this specification to include cords, cables, wires and other elongate flexible tendons.

The present invention provides a solution to the above and other problems which offers advantages over the background art.

SUMMARY OF THE INVENTION

The invention relates to a cable or cord winder consisting of a body to which a cable or cord may be anchored and from which the cable or cord may extend and which body is at least partially surrounded by a rotatable bobbin journalled upon the body, the cable being windable onto the body within the rotatable bobbin from a direction substantially aligned with the bobbin axis, wherein the bobbin rotation is indexed by coaction between at least one projection or depression on the body and at least one depression or projection on the bobbin.

In one embodiment, the bobbin has an external cylindrical surface and internal axially spaced surfaces bearing on the body.

In another embodiment, one axially spaced surface consists of multiple fingers extending into contact with the body, the cord or cable passing out of the bobbin between two adjacent fingers of the multiple fingers.

The number of multiple fingers may be four.

The cord or cable may extend from the body aligned in the direction of the bobbin axis and pass slidably into the body within the bobbin.

In an embodiment, the bobbin has an internal bobbin projection slidably engagable with the cord or cable to wrap it around the body as the bobbin is rotated on the body.

In another embodiment, the projection or depression on the body consists of a flexible projection and the depression or projection on the bobbin consists of multiple projections.

In one embodiment, the body has a single projection and the bobbin has eight projections.

In a further embodiment, the projection or depression on the body consists of multiple projections and the depression or projection on the bobbin consists of a fixed projection and the bobbin is flexibly mounted to the body.

In a yet further embodiment, the bobbin may be rotated in either direction.

The winder may be supported by a strap.

Alternatively, the invention may be said to lie in a method of winding a cable comprising providing a body with at least one cylindrical portion, providing a bobbin rotatable on the cylindrical body portion the bobbin having at least one hole providing external access through a side of the bobbin to a toric space within the bobbin, providing a detent mechanism resisting rotation of the bobbin on the body, and rotating the bobbin relative to the body to wind a cable through the side of the bobbin onto the body.

In a further exemplification, the invention lies in a method of winding a cable comprising providing a body with at least one cylindrical portion, providing a bobbin rotatable on the cylindrical body portion the body portion having at least one hole providing external access to a space within the bobbin, providing a detent mechanism resisting rotation of the bobbin on the body, and rotating the bobbin relative to the body to wind a cord or cable through the one hole to the space within the bobbin.

The method may include providing a finger extending from the bobbin and engaging the cable with the finger to align the cable on the body within the bobbin.

In yet a further exemplification, the invention lies in a cable or cord winder consisting of a body to which a cable or cord may be anchored and from which the cable or cord may extend and which body is at least partially surrounded by a rotatable bobbin journalled upon the body, the cable being windable onto the body within the rotatable bobbin from a direction substantially aligned with the bobbin axis, wherein the bobbin rotation is indexed by coaction between at least one projection or depression on the body and at least one depression or projection on the bobbin and the bobbin has an internal bobbin projection slidably engagable with the cord or cable to wrap it around the body as the bobbin is rotated on the body wherein the internal bobbin projection extends a loop around the body portion on which the cable or cord is wrapped.

In yet a further exemplification, the invention lies in a cable or cord winder consisting of a body to which a cable or cord may be anchored and from which the cable or cord may extend and which body is at least partially surrounded by a rotatable bobbin journalled upon the body, the cable being windable onto the body within the rotatable bobbin from a direction substantially aligned with the bobbin axis, wherein the bobbin rotation is indexed by coaction between at least one projection or depression on the body and at least one depression or projection on the bobbin and the bobbin has an internal bobbin projection slidably engagable with the cord or cable to wrap it around the body as the bobbin is rotated on the body wherein the internal bobbin projection extends a single strand of cord or cable around the body portion on which the cable or cord is wrapped.

Alternatively, the invention may lie in a cable winder assembly having axially arranged two cable or cord winders of the different kinds referred to in each of the paragraphs above.

BRIEF DESCRIPTION OF THE DRAWINGS

These and other features of as well as advantages which characterize the present invention will be apparent upon reading of the following detailed description and review of the associated drawings.

DETAILED DESCRIPTION OF THE INVENTION

Figure 1:
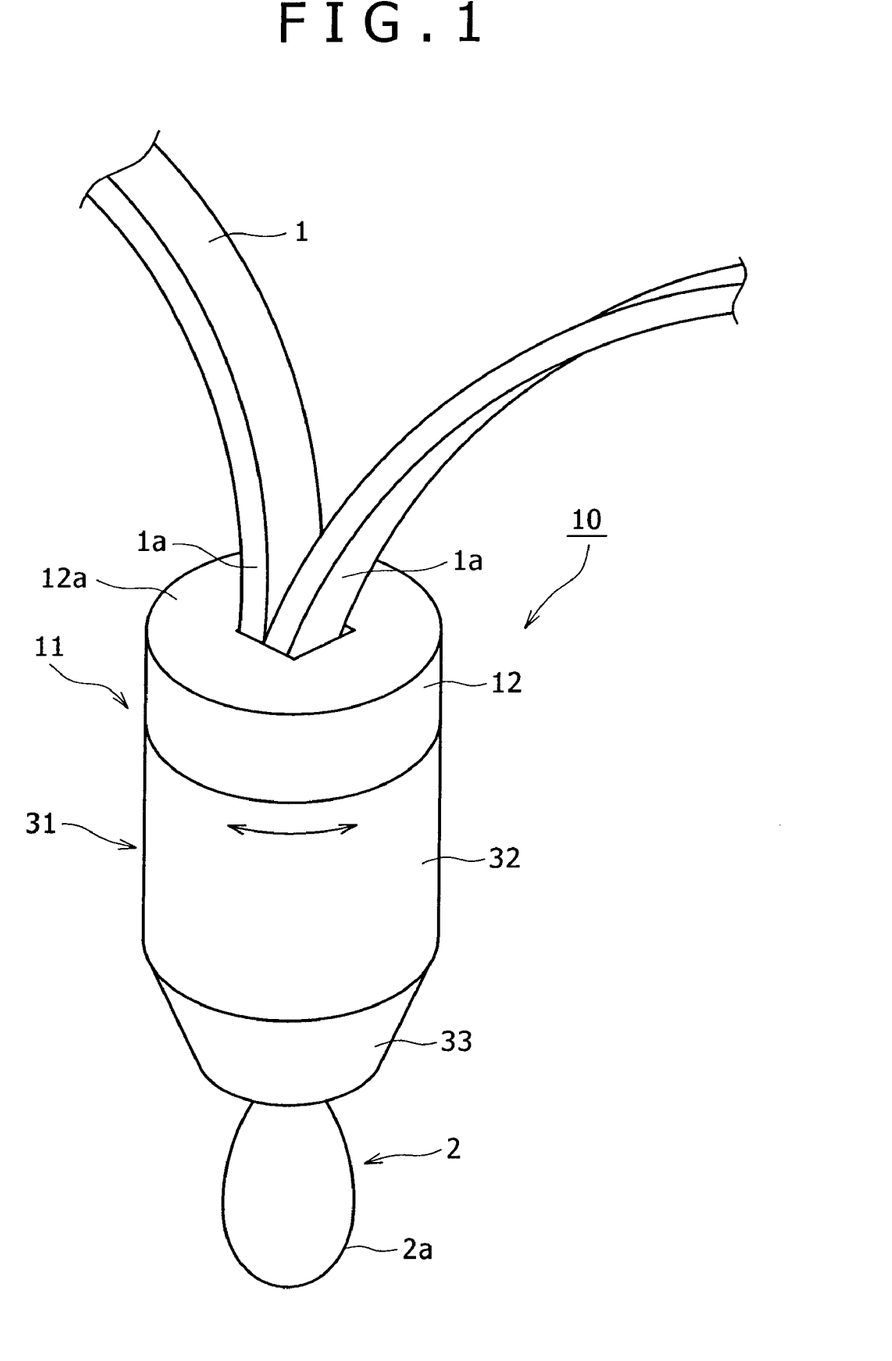
FIG. 1 is a perspective view of a first version of a cord winder.

As shown in FIG. 1, the cord winding apparatus to which the present invention is applied is attached to end portions of a strap 1 by which a user suspends a small-sized electronic apparatus such as portable telephone set from the neck or the like. The cord winding apparatus winds in and out a loop-shaped cord 2 attached to the electronic apparatus.

Figure 2:
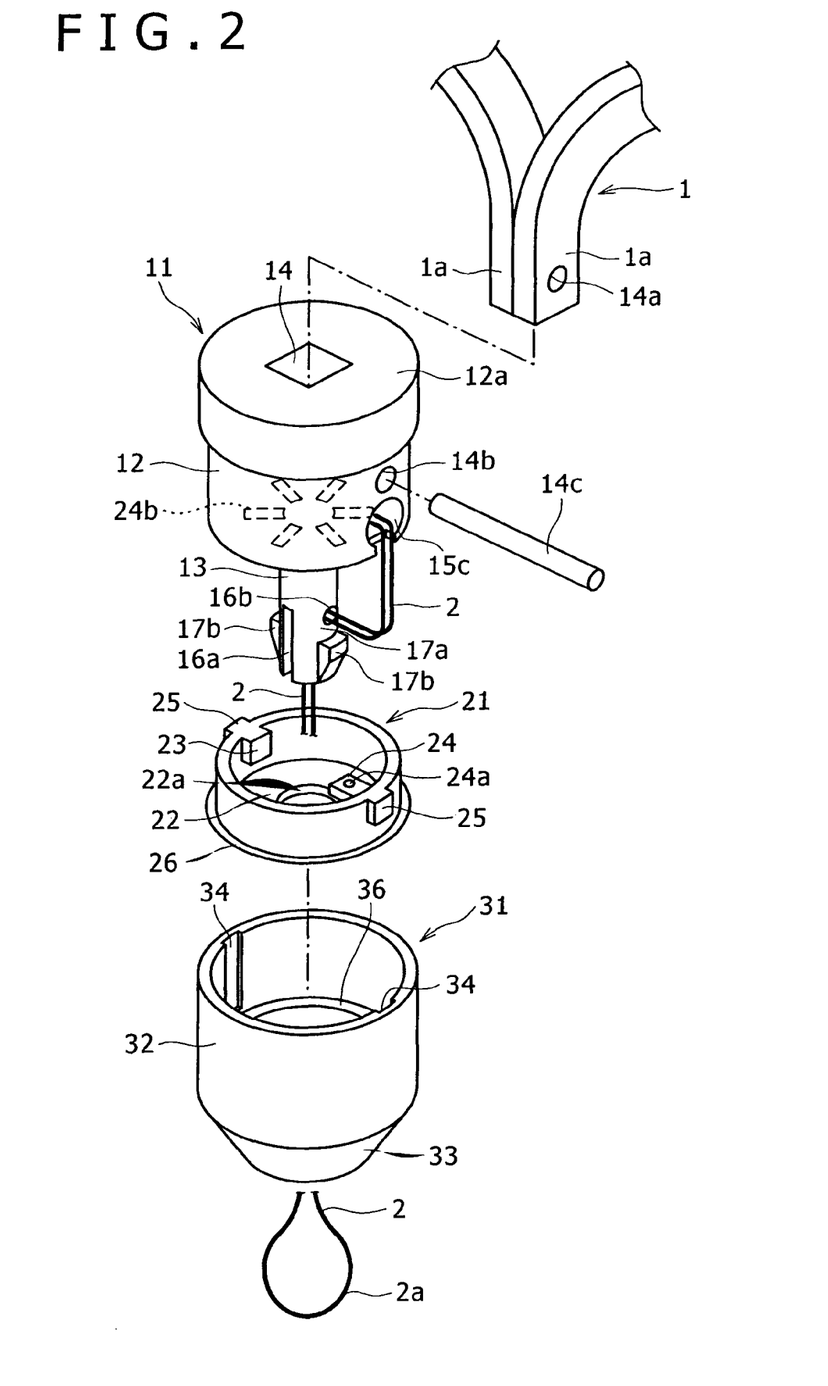
FIG. 2 is an exploded view of FIG. 1.
Figure 3:
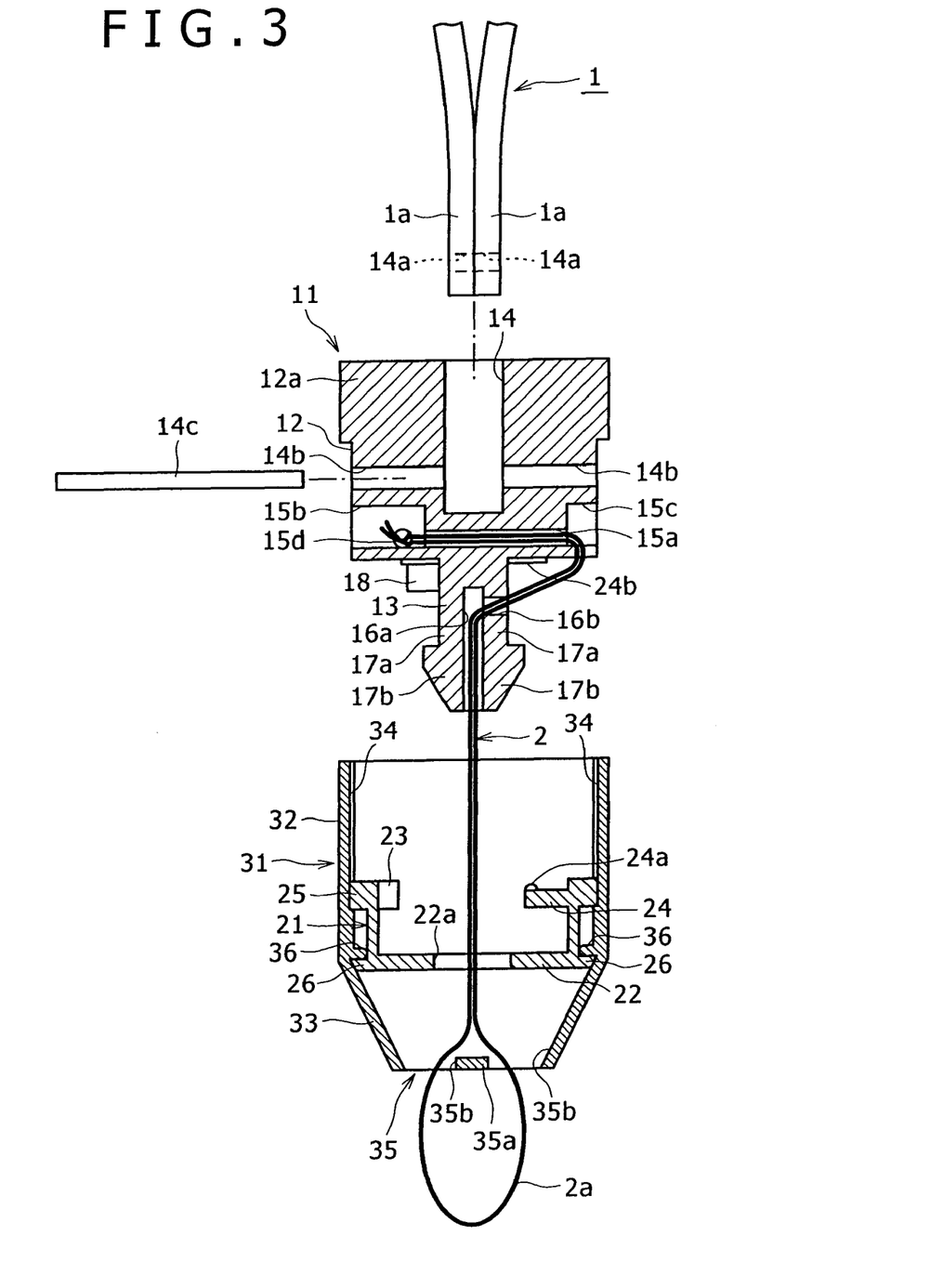
FIG. 3 is a cross-sectional exploded view of FIG. 1.

As shown in FIGS. 1 to 3, the cord winding apparatus 10 to which the present invention is applied includes a body member 11 to which end portions 1a, 1a of the strap 1 are secured and to which the loop-shaped cord 2 is secured and which takes up the loop-shaped cord 2, a cord winding member 21 for wrapping the loop-shaped cord around the body member 11, and a bobbin member 31 attached to the cord winding member 21.

The body member 11 includes, at a fixing portion 12 thereof for fixing end portions of the strap 1 and the loop-shaped cord 2, a core portion 13 around which the loop-shaped cord 2 is to be wrapped, as shown in FIGS. 2 and 3.

The fixing portion 12 is formed in a substantially cylindrical shape and forms part of an outer housing. The fixing portion 12 has formed on an upper face thereof an attaching recessed portion 14 to which the opposite end portions 1a, 1a of the strap 1 which overlap with each other are to be attached. The strap 1 is a flexible material and has attaching holes 14a, 14a formed at the end portions 1a, 1a thereof. The attaching recessed portion 14 is sized such that the end portions 1a, 1a of the strap 1 can be inserted and held therein. The attaching recessed portion 14 has through-holes 14b, 14b formed on side faces opposed to each other near the bottom face of the recess. Further, the attaching holes 14a, 14a for fixing the strap 1 to the attaching recessed portion 14 are formed near the end portions 1a, 1a of the strap 1. The end portions 1a, 1a of the strap 1 are inserted in the attaching recessed portion 14 with the end portions 1a, 1a overlapping with other and are aligned with the attaching holes 14a, 14a. A fixing pin 14c is force fitted into the through-holes 14b, 14b and the attaching holes 14a, 14a to fix the strap 1 to the body member 11. The strap 1 is thereby attached, for example, in a loop-shaped configuration to the fixing portion 12. Further, as shown in FIGS. 2 and 3, an insertion hole 15a formed in a radial direction with a first recessed portion 15b and a second recessed portion 15c formed continuously on the opposite sides of the insertion hole 15a are provided as means for fixing the loop-shaped cord 2 to the body member 11. As shown in FIG. 3, the cord 2 is fitted with the end portions thereof held in a lined up state into the insertion hole 15a from the second recessed portion 15c side and an end portion knot or stopper 15d is formed at an end portion of the cord 2 on the first recessed portion 15b side to prevent the loop-shaped cord 2 from slipping out of the insertion hole 15a.

Figure 8:
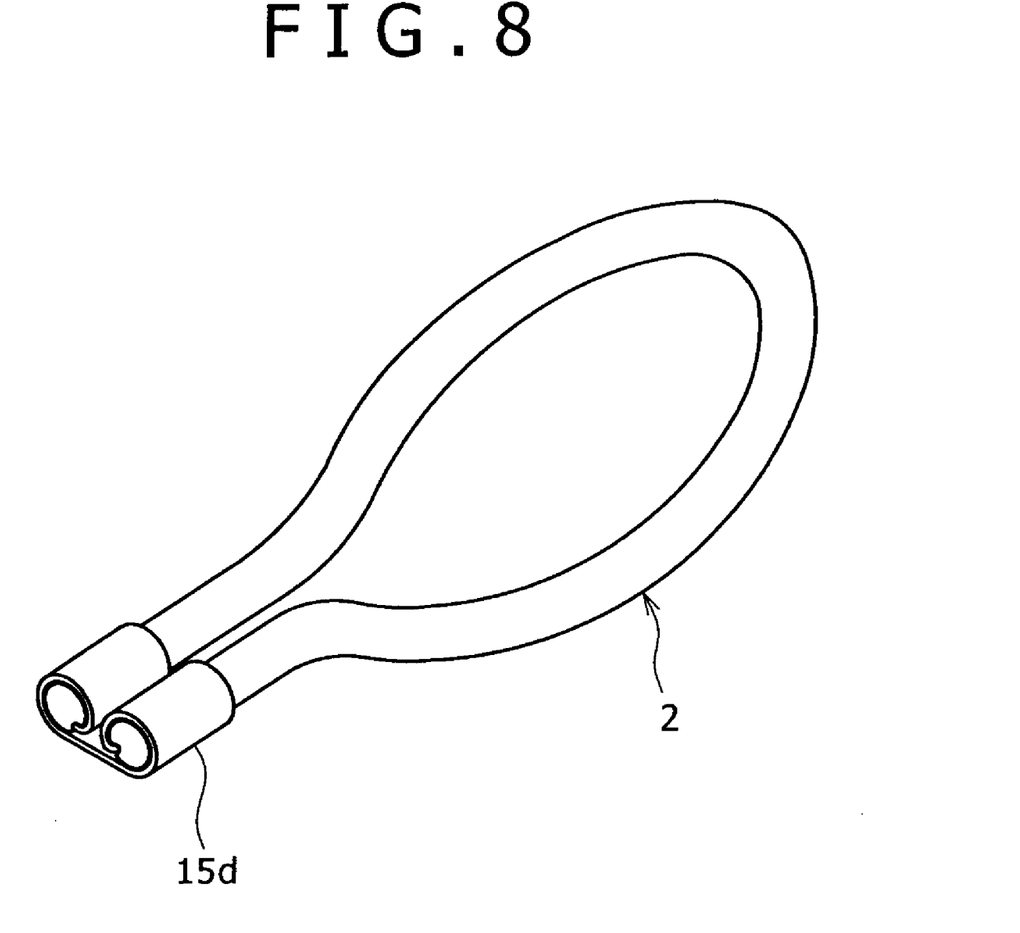
FIG. 8 is a view of a support cord for use in the cord winder.

Accordingly, from the second recessed portion 15c, the loop-shaped cord 2 is led out to the core portion 13 side. It is to be noted that, in the case of FIG. 3, the end portion 15d includes a knot so as to retain the end portions. The end portion processing portion 15d may be formed from a caulking member to secure the opposite ends of the loop-shaped cord 2 as shown in FIG. 8 where a caulking member 15a retains the end of loop 2.

The core portion 13 of a substantially cylindrical shape is formed on a lower face of such a fixing portion 12 of body member 11 as described above. The core portion 13 has a slit 16a formed in an axial direction, and has a through-hole 16b formed at a middle portion thereof in a radial direction in such a manner as to open into slit 16a. The loop-shaped cord 2 is led out from the second recessed portion 15c and is inserted into a through-hole 16b formed so as to extend to the slit 16a in a radial direction of the core portion 13, and passes through the slit 16a and is led out from an end portion of the core portion 13.

The core portion 13 has a half-divided state because of the slit 16a thereof, and half bodies 17a, 17a of the core portion 13 can be resiliently displaced in a radial direction. Further, locking projections 17b, 17b for attaching the body member 11 to the cord winding member 21 are formed as outwardly directed projections of the half bodies 17a, 17a of the core portion 13. In addition, a stopper projection 18 for restricting the range of rotation of the cord winding member 21 and the bobbin member 31 relative to the body member 11 is formed at a root portion of the core portion 13.

Figure 4:
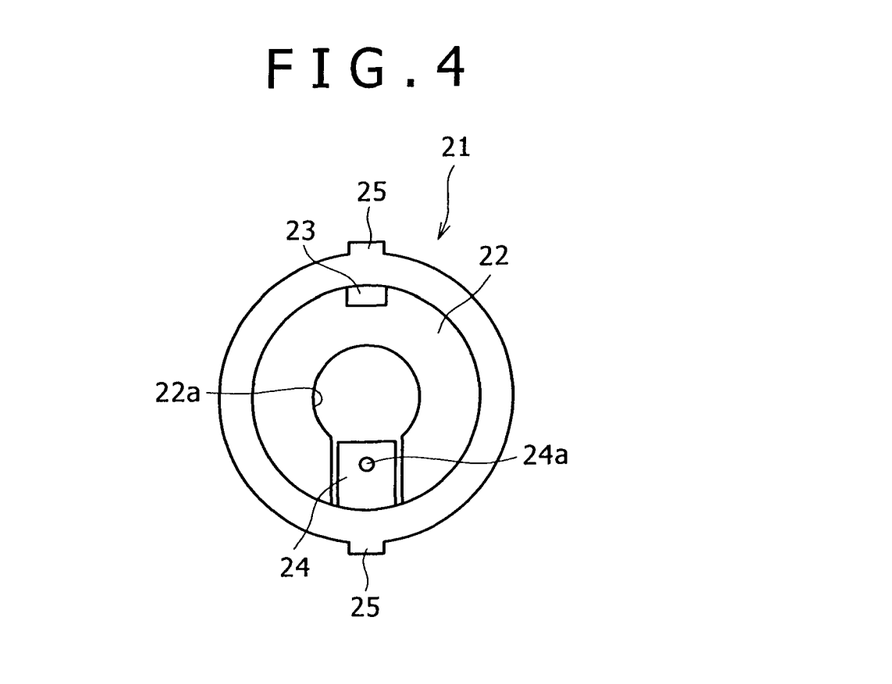
FIG. 4 is a top view of the take up member of FIG. 2.
Figure 5:
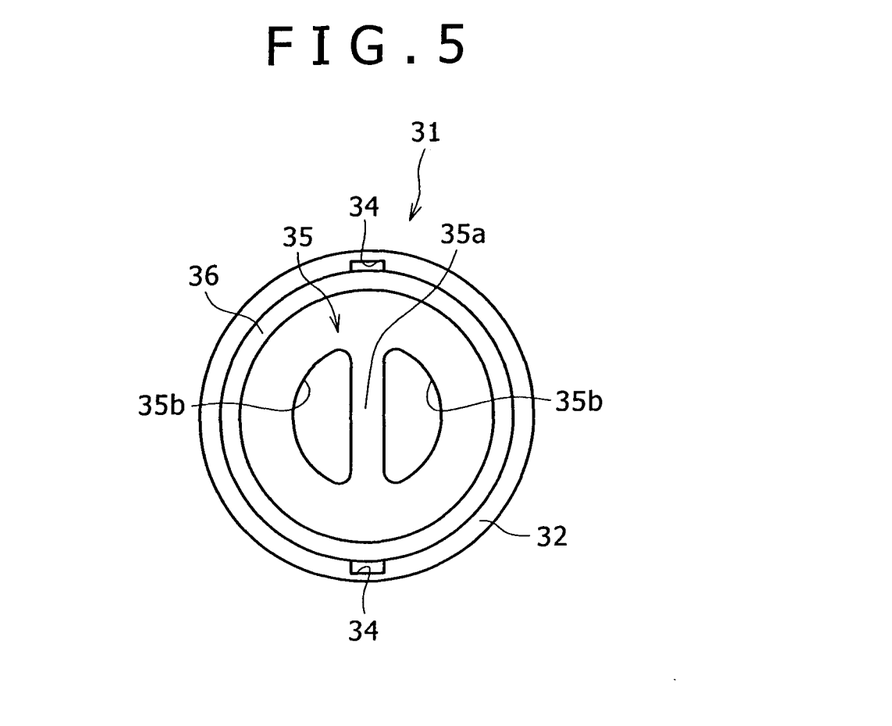
FIG. 5 is a top view of the bobbin member without the take up member in place.

The cord winding member 21 to which the body member 11 as described above is attached is formed in a substantially cylindrical shape as seen in FIGS. 2 to 4, and an retaining plate 22 is attached to the bobbin member 31 on the inner side of the cord winding member 21. An end portion of the core portion 13 of the body member 11 is inserted into a central opening 22a of the substantially annular retaining plate 22 through resilient displacement of the half bodies 17a, 17a, and the locking projections 17b, 17b are locked at peripheral portions of the opening 22a of the retaining plate 22. Consequently, the cord winding member 21 is attached for rotation on the body member 11 in a state wherein it is prevented from coming off. The substantially tubular cord winding member 21 has a stop 23 formed at an opening end thereof on the body member 11 side for engaging with the stopper projection 18. Accordingly, the cord winding member 21 may be rotated, for example, within a range in which the stopper 23 does not engage with the stopper projection 18 of the body member 11, for example, over approximately 90° to 270° with respect to the body member 11. In other words, the range of rotation of the cord winding member 21 is determined taking the location and size of stopper projection 18 and the stopper 23, the length of the loop-shaped cord 2, the adjustment amount of the length of the loop-shaped cord 2 to be led out from the end portion of the bobbin member 31 and so forth into consideration.

Figure 6:
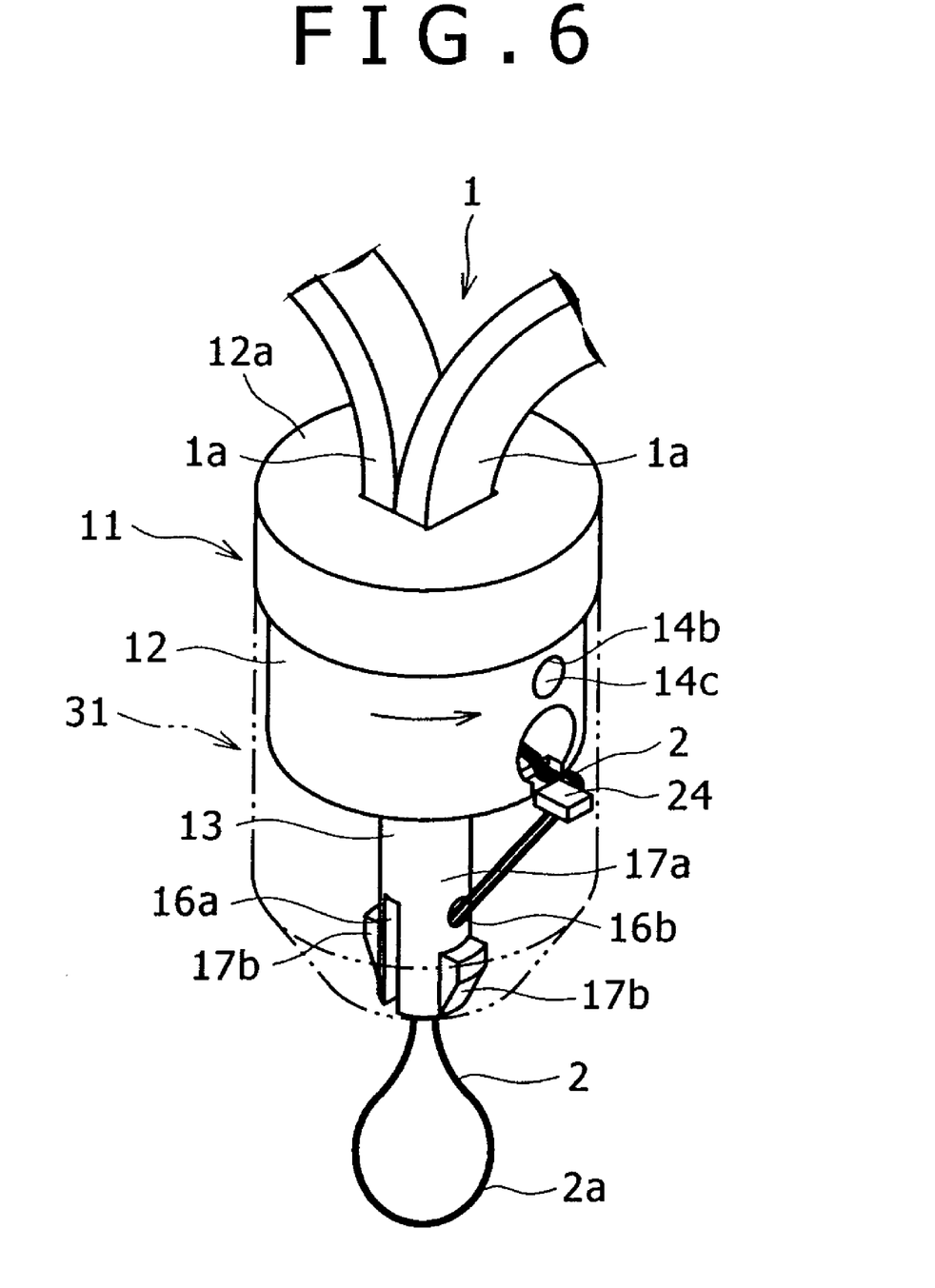
FIG. 6 is a perspective view of the winder with the majority of the bobbin ghosted.

Further, a tooth 24 is formed on the substantially cylindrical cord winding member 21 such that it projects to the inner side as shown in FIG. 6. When the cord winding member 21 is attached to the body member 11, the tooth 24 engages with the loop-shaped cord 2 which extends from the second recessed portion 15c of the fixing portion 12 to the through-hole 16b of the core portion 13. Then, when the cord winding member 21 is rotated in the direction indicated by an arrow mark in FIG. 6 relative to the body member 11, the tooth 24 winds the cord 2 on the core portion 13.

A projection 24a is formed on a face of the tooth 24 on the body member 11 side. The projection 24a slidably engages with a lower face of the fixing portion 12 around the core portion 13. Protrusions 24b are formed, for example, radially on the lower face of the fixing portion 12 with which the projection 24a slidably engages, around the core portion 13. Accordingly, when the cord winding member 21 is rotated relative to the body member 11, the projection 24a of the tooth 24 moves along the protrusions 24b formed on the lower face of the fixing portion 12 around the core portion 13 thereby to provide a click feeling to the user.

The bobbin member 31 is a member which is attached integrally to the cord winding member 21 and rotates integrally with the cord winding member 21 with respect to the body member 11, and forms part of an outer housing together with the fixing portion 12 of the body member 11. The bobbin member 31 serves as an operating section when the user performs a rotating operation for taking up or taking out the loop-shaped cord 2. The bobbin member 31 includes a collar 32 which surrounds the lower portion of body member 11 and to which the cord winding member 21 is attached, and a lead out portion 33 for leading out the loop-shaped cord 2.

A plurality of engaging projections 25, 25 on cord winding member 21 engage with slots 34, 34 on the inner circumference of collar 32 to cause tooth 24 to rotate integrally with the bobbin member 31. The cord winding member is retained by projections 26 which snap fit over projections 36 on the collar 32.

The collar 32 is sized so that the cord winding member 21 is accommodated in the collar 32 and the top face 12a of the fixing portion 12 of the body member 11 which projects like a flange is exposed to the outside. Engaging grooves 34, 34 are formed on an inner circumferential face of the attaching portion 32 in such a manner as to engage with the engaging projections 25, 25 formed on an outer circumferential face of the cord winding member 21.

The lead out portion 33 is formed so as to have a reduced diameter from that of the attaching portion 32, and an opening 35 for leading out the loop-shaped cord 2 to the outside is formed at an end portion of the lead out portion 33. The opening 35 is partitioned in two by a partitioning portion 35a, and the loop-shaped cord 2 is led out from leading openings 35b, 35b. In particular, the loop-shaped cord 2 forms a loop 2a on the outside of the opening 35 and can be taken up until the loop 2a of the loop-shaped cord 2 is caught by the partitioning portion 35a so that the end of the loop 2a does not enter the inside.

It is to be noted that a substantially similar effect can be achieved even if the partitioning portion 35a is not provided at the opening 35 of the bobbin member 31 as described above but provided at the opening 22a in the attaching plate 22 of the cord winding member 21.

In order to assemble such a cord winding apparatus 10 as described above, as shown in FIG. 3, first the cord winding member 21 is snap fitted so that the projections 26 rides over the engaging portion 36 of the bobbin member 31 until the engaging projections 25, 25 of the cord winding member 21 are engaged with the engaging grooves 34, 34 of the bobbin member 31 thereby to integrate the cord winding member 21 and the bobbin member 31 with each other.

Then, end portions of the single cord 2 which is not in a loop-shaped state are individually inserted into the leading openings 35b, 35b, and then, in a state wherein the end portions are lined up, they are inserted into the opening 22a of the attaching plate 22 of the cord winding member 21. Further, the end portions of the cord 2 are led out from the end portion of the core portion 13 of the body member 11 through the through-hole 16b past the slit 16a, and then are led out from the second recessed portion 15c to the first recessed portion 15b through the insertion hole 15a. Thereupon, the loop-shaped cord 2 which extends from the second recessed portion 15c of the fixing portion 12 to the through-hole 16b of the core portion 13 is engaged with the tooth 24. The end portions of the cord 2 are then tied to each other at the first recessed portion 15b so that the cord 2 exhibits a loop-shaped state. The end portion 15d has a greater diameter than the insertion hole 15a so that the cord does not slip through the insertion hole 15a.

Figure 7:
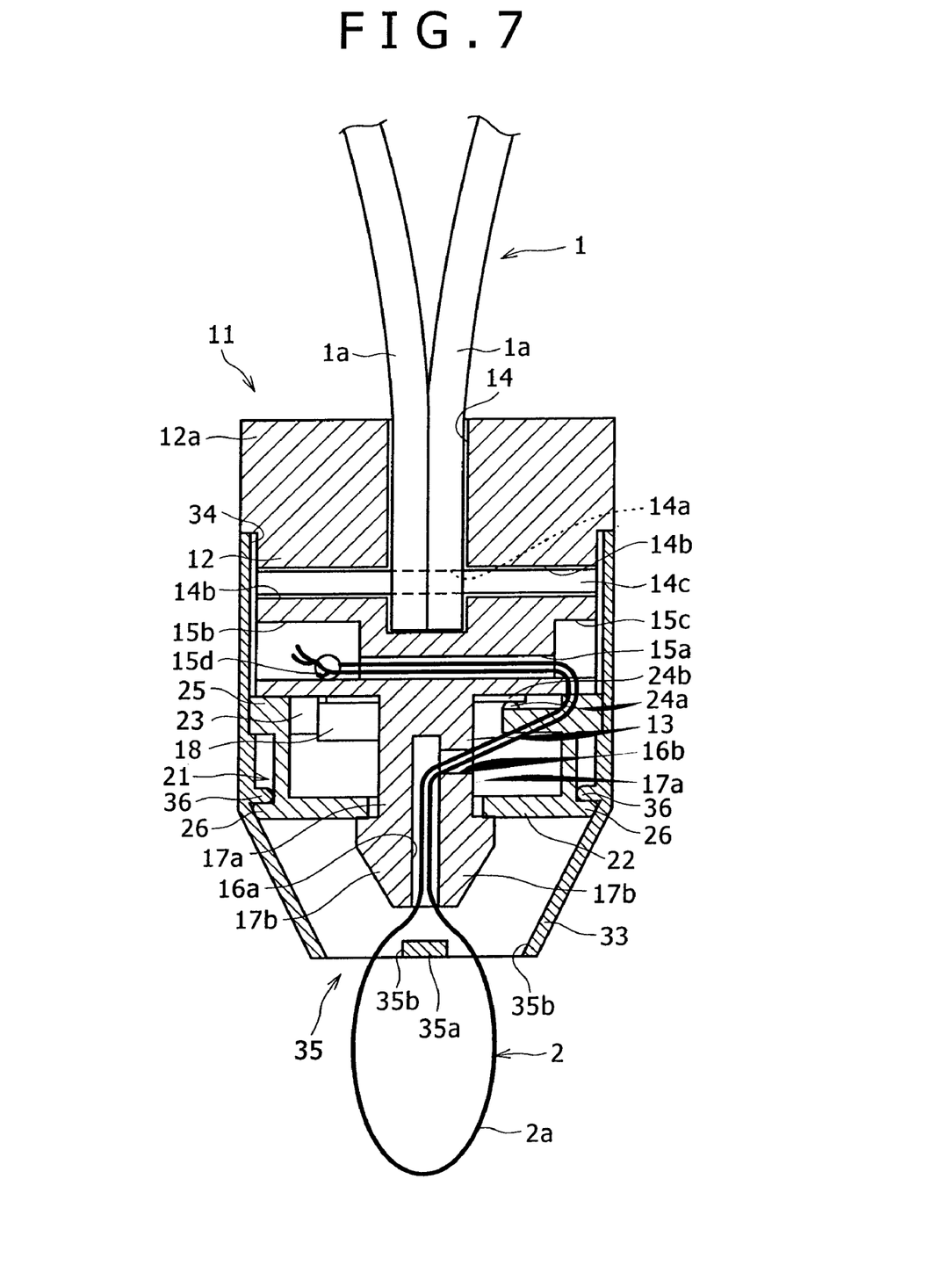
FIG. 7 is a cross-sectional assembled view of FIG. 1.

Thereafter, as shown in FIG. 7, the body member 11 is inserted into the cord winding member 21 attached to the bobbin member 31, and the end portion of the core portion 13 is inserted into the central opening 22a of the attaching plate 22 through resilient displacement of the half bodies 17a, 17a so that the body member 11 is attached to the cord winding member 21. Then, the body member 11 is attached to the bobbin member 31 such that the through-holes 14b, 14b for securing the core portion 13 to the strap 1 and the first and second recessed portions 15b, 15c for securing the loop-shaped cord 2 are hidden by the bobbin member 31 and a stepped portion on the lower side which forms the top face 12a abuts with the upper side opening end of the attaching portion 32 of the bobbin member 31.

It is to be noted that the strap 1 may be attached to the body member 11 before or after the body member 11 is attached to the cord winding member 21.

An operating method for the cord winding apparatus 10 having a configuration as noted above is described with reference to FIGS. 6 and 7. In order to take up the loop-shaped cord 2 led out from the end portion of the bobbin member 31, the cord winding member 21 attached to the bobbin member 31 is rotated in one of the opposite directions with respect to the body member 11. Consequently, the tooth 24 with which the loop-shaped cord 2 extending from the second recessed portion 15c of the fixing portion 12 to the through-hole 16b of the core portion 13 is engaged wraps the loop-shaped cord 2 around the core portion 13 of the body member 11 together with rotation of the cord winding member 21 which rotates together with the bobbin member 31. Consequently, the loop-shaped cord 2 led out from the opening 35 of the bobbin member 31 is taken up to reduce the length thereof from the opening 35. Thereupon, the loop-shaped cord 2 can be taken up until it is caught by the partitioning portion 35a of the opening 35.

On the other hand, in order to let out the loop-shaped cord 2 led out from the opening 35 at the end portion of the bobbin member 31, the cord winding member 21 attached to the bobbin member 31 is rotated in the other one of the opposite directions with respect to the body member 11. Consequently, the loop-shaped cord 2 wrapped around the core portion 13 of the body member 11 is slackened and may be taken out to the outside automatically or if the user pulls the loop-shaped cord 2 led out from the opening 35 of the bobbin member 31.

When rotating the bobbin member 31 a detent feeling is provided to the user as the projection 24a of the tooth 24 moves along the concave and convex configuration formed on the lower face of the fixing portion 12 around the core portion 13.

As described above, according to the cord winding apparatus 10 to which the present invention is applied, by rotatably operating the bobbin member 31, the length of the loop-shaped cord 2 led out from the end portion of the bobbin member 31 for attaching a small-sized electronic apparatus such as a portable telephone set can be varied to a desired length by the user using the tooth 24 of the cord winding member 21 attached integrally to the bobbin member 31, within the confines of movement available with stops 18 and 23.

Figure 9:
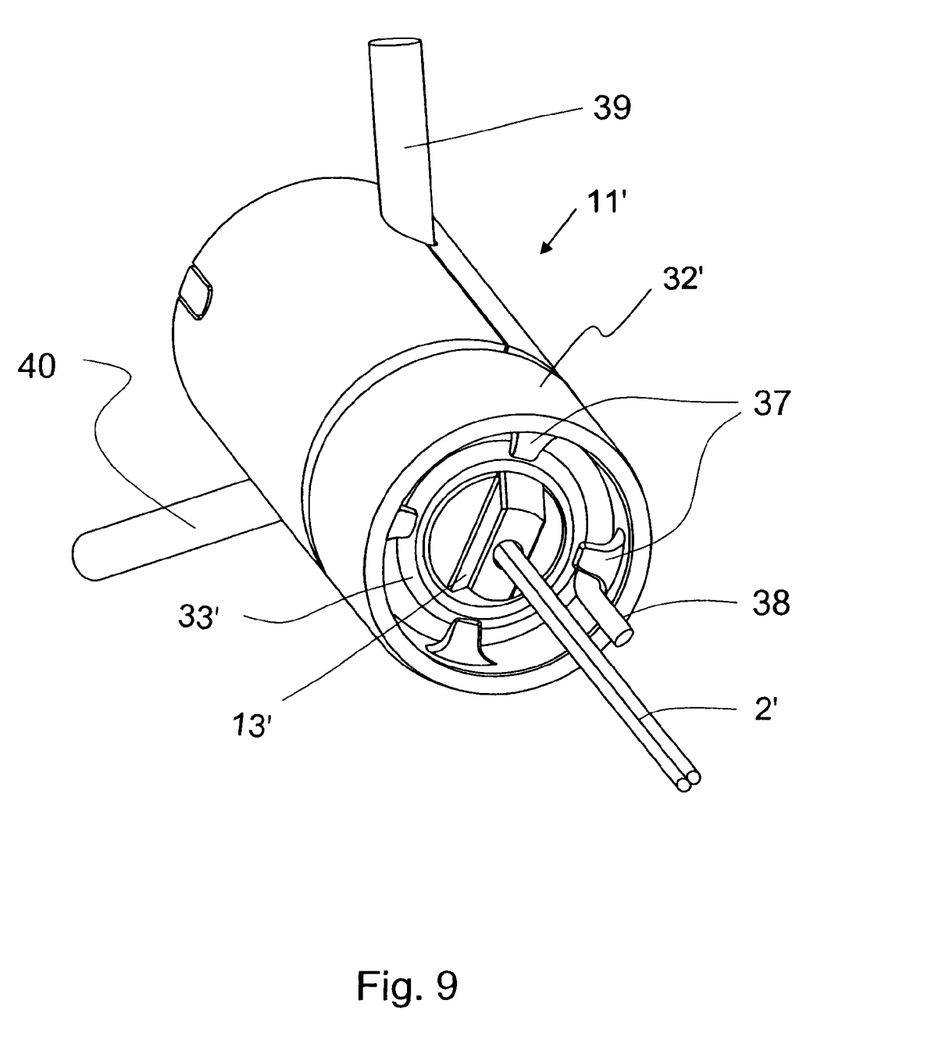
FIG. 9 is a general perspective view of a second version of a cord winder.

Referring now to a second version of the winder in FIG. 9, a perspective view of a cord winder is shown and consists of a body 11' and a winding bobbin portion 32' with cords 39, 40 each to an earphone. The winder may be suspended by a lanyard 2' and has an electrical cord 38 to a supply source, the cord being windable around a central cylindrical portion 13' to be retained within the bobbin portion. Bobbin 32' has an external cylindrical surface with fingers 37 which substitute for an axial collar, extending in to a groove at the tip of cylindrical portion 13' to prevent the cord 38 from being trapped between the two and to journal the rotation.

Rotation of the bobbin 32' will either wind or unwind cord 38 from storage around cylindrical portion 13'.

Figure 10:
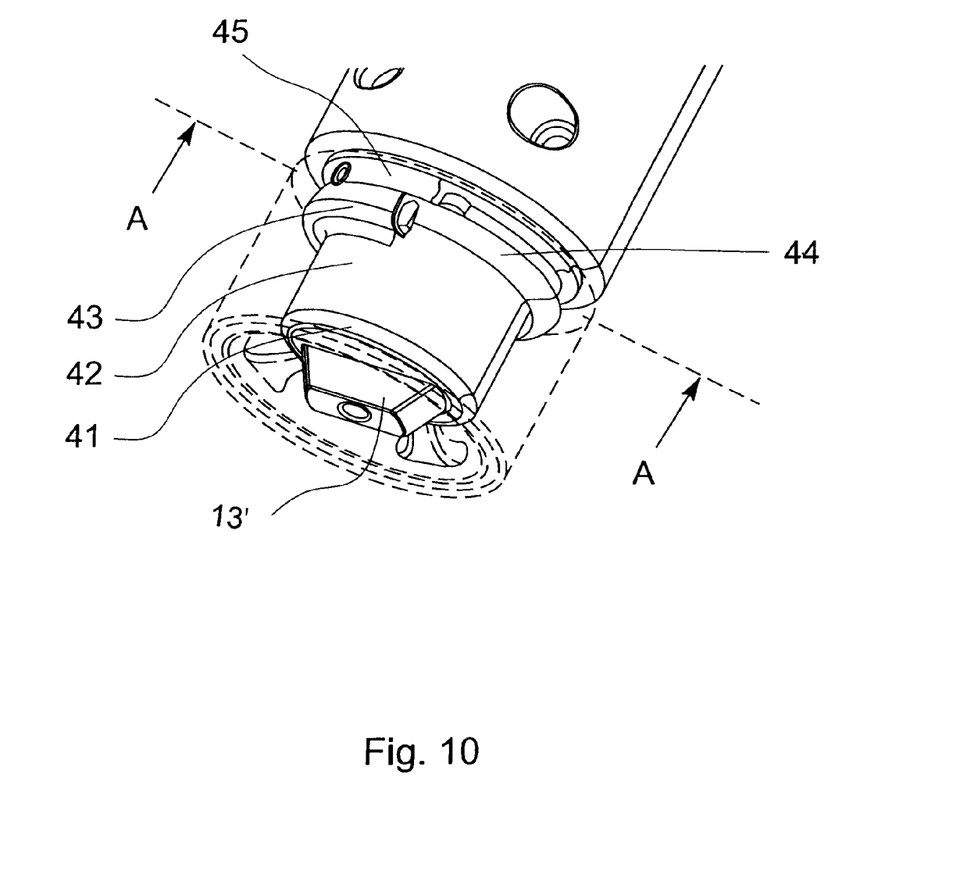
FIG. 10 is a perspective view of the central portion of the second cord winder with the bobbin ghosted.
Figure 11:
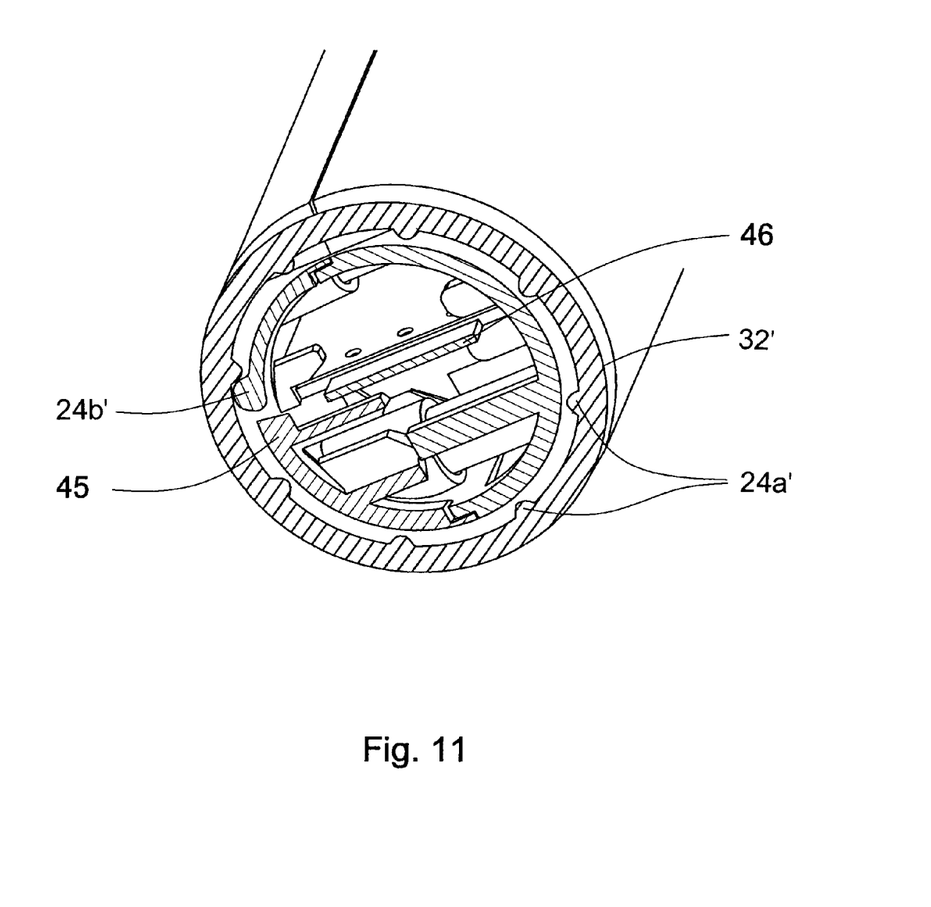
FIG. 11 is a cross-sectional view in the vertical plane on line A-A of FIG. 10.

FIG. 10 shows the operative end of the cylindrical portion in more detail with an extended cylindrical surface 42 between the open end of the storage portion and a scrolled projecting surface 43 which both limits the storage extent and acts to retain the winding bobbin as best seen in conjunction with FIG. 11. The inner end of scrolled surface 43 ends in an outwardly biased flexible tooth 44 and a journaling surface 45 extends around remainder of the body inside scrolled surface 43.

As shown in the cross-section FIG. 11 bobbin 32' has surface projections 24b' which are preferably rounded and which coact with flexible tooth 24a' to provide indexing of the rotation of the bobbin 32' on body 11', the projections 24b' and tooth 24a40 allowing rotation in either direction but preventing inadvertent movement. In this regard, projections 24bcan slide through the depressions between teeth 24a, but are prevented from additional inadvertent movement when projections 24bare in contact with teeth 24a. To move projections 24bbeyond teeth 24a, a user must actively rotate the body with respect to the bobbin to force projections 24binto the next depression after the tooth with which the projection is in contact.

Projections 24b' of are of such a size that they may be forced over surface 43 for assembly but are then trapped laterally within the scrolled surface for rotation on journaling surface 45, with the outer end of the bobbin 32' journalled by the coaction of fingers 37 on surface 33'. The projections therefore act as an abbreviated collar delimiting the inward extent of the bobbin 32'.

Body 11', which is preferably assembled from two halves, may contain electronic circuit board 46 to allow connection of cables and anchoring of the inner end of cable 38.

Figure 12:
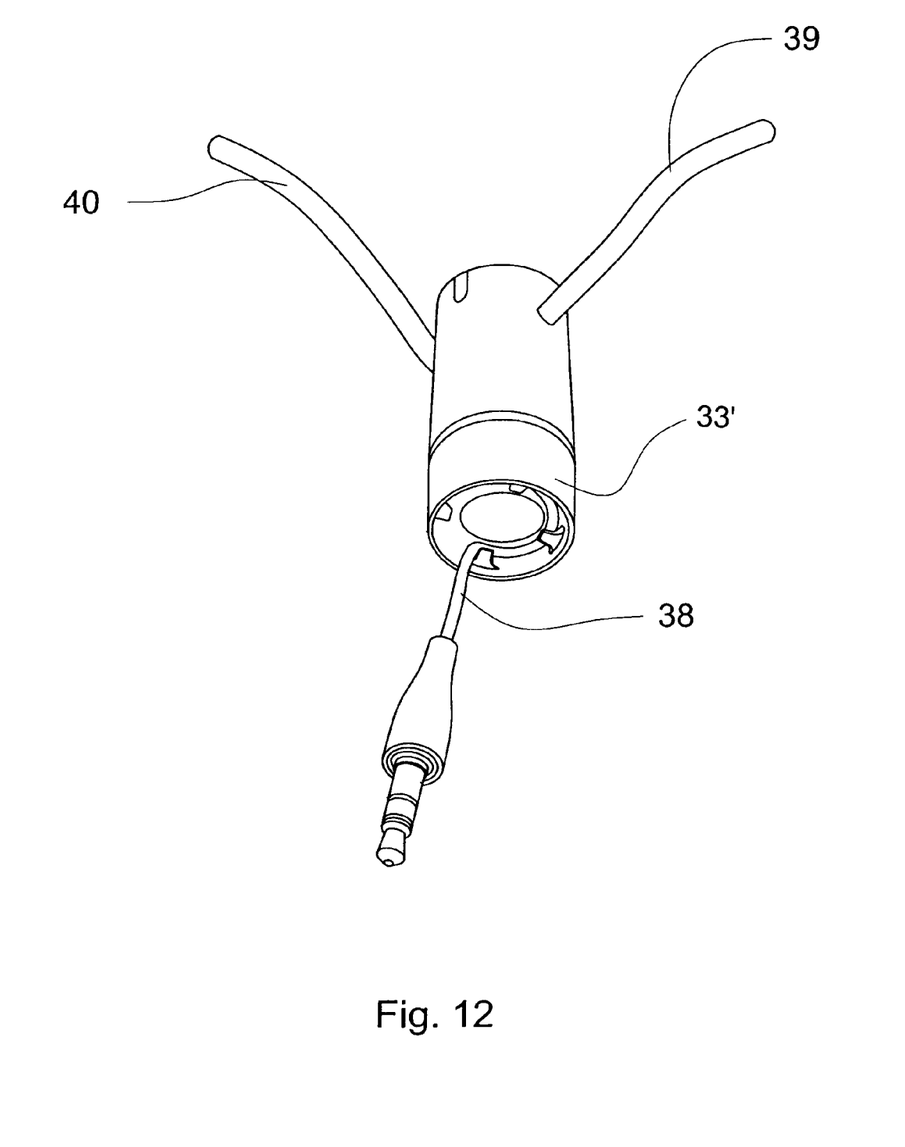
FIG. 12 is a perspective view of the cord winder in use.

As shown in FIG. 12 the supply cord 38 may be substantially contained within the winder bobbin 32'.

While the drawings show four fingers 37 on the bobbin a lesser or greater number may be used, consistent with easy rotation of the bobbin on the body 11', and may consist of a solid collar with a single slot for the cable.

While one flexible tooth 24b' is shown more may be used if it is desired to provide a balanced bias to the bobbin location on body 11'.

It is to be noted that the strap 1 may be of the type wherein an accessory or the like is attached thereto, and the article to be attached to the loop-shaped cord 2 is not limited to a small-sized electronic apparatus.

The two variations of the invention described above allow the winding of a cord, wire or cable axially of a winder with, respectively, the cord passing through the device rotation axis, or entering the winder offset from the device rotation axis. If desired both embodiments may be included in a single mechanism, allowing adjustment of both a supporting cord for a suspended item and the cord of a headset plugged in to the item.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the cord winder may vary dependent on the particular application for which it is used without departure from the scope of the present invention.

In addition, although the preferred embodiments described herein are directed to a cord winder for headsets or earphones, it will be appreciated by those skilled in the art that the teachings of the present invention can be applied to other systems such as cable winders for larger mechanisms such as irons and hand drills, without departing from the scope and objective of the present invention.

The cord winder of the invention is used in the field of consumer electronics to present a user with an adjustable length of cable or cord for a portable appliance.

The invention claimed is:

1. A wire winder comprising:
   a body configured to anchor two ends of a wire and such that the wire extends from the body forming a loop, the body including at least one projection; and
   a rotatable bobbin journalled on the body and at least partially surrounding the body, the wire being windable onto the body within the rotatable bobbin from a direction substantially aligned with a bobbin axis, the rotatable bobbin including at least one projection, wherein two portions of the wire are simultaneously wound onto the body when the bobbin moves with respect to the body.

2. The wire winder as claimed in claim 1, wherein the bobbin has an external cylindrical surface and internal axially spaced surfaces bearing on the body.

3. The wire winder as claimed in claim 1 wherein the wire extends from the body aligned in the direction of the bobbin axis and passes slidably into the body within the bobbin.

4. The wire winder as claimed in claim 3, wherein the bobbin includes an internal bobbin projection slidably engagable with the wire to wrap the wire around the body as the bobbin is rotated on the body.

5. The wire winder as claimed in claim 1, wherein the projection on the body includes a flexible projection and the projection on the bobbin includes multiple projections.

6. The wire winder as claimed in claim 5, wherein the body has a single projection and the bobbin has eight projections.

7. The wire winder as claimed in claim 1, wherein the projection on the body includes multiple projections and the projection on the bobbin includes a fixed projection, and the bobbin is flexibly mounted to the body.

8. The wire winder as claimed in claim 1, wherein the bobbin is configured to be rotated in either direction.

9. The wire winder as claimed in claim 1, wherein the wire winder is supported by a strap.

10. The wire winder as claimed in claim 1 wherein the bobbin includes a partitioning portion which prevents the loop from entering the bobbin.

11. A wire winder comprising:
a body configured to anchor two ends of a wire such that the wire extends from the body forming a loop, the body including at least one projection;
a rotatable bobbin journalled on the body and at least partially surrounding the body, the wire being windable onto the body within the rotatable bobbin from a direction substantially aligned with a bobbin axis, the rotatable bobbin including at least one projection,
wherein the at least one projection includes an internal bobbin projection slidably engagable with the wire to wrap the wire around the body as the bobbin is rotated on the body, and the internal bobbin projection extends the loop around a body portion on which two portions of the wire are simultaneously wrapped as the bobbin moves with respect to the body.

* * * * *